United States Patent [19]
Ross et al.

[11] 3,786,413

[45] Jan. 15, 1974

[54] VEHICLE TIRE CONDITION MONITOR SYSTEM

[75] Inventors: Hugh B. Matthews, Acton; Gerald F. Ross, Lexington; Kenneth W. Robbins, Wilmington, all of Mass.

[73] Assignee: Sperry Rand Corporation, New York, N.Y.

[22] Filed: Jan. 13, 1972

[21] Appl. No.: 217,608

[52] U.S. Cl. .................................. 340/58, 325/117
[51] Int. Cl. ............................................. B60c 23/02
[58] Field of Search ......................... 340/58, 227 R; 325/111, 117

[56] References Cited
UNITED STATES PATENTS

| | | | |
|---|---|---|---|
| 3,178,686 | 4/1965 | Mills | 340/58 |
| 3,093,812 | 6/1963 | Brown | 340/58 |
| 2,894,246 | 7/1959 | Graffenried | 340/58 X |
| 2,629,086 | 2/1953 | Ainsworth et al. | 340/58 |

Primary Examiner—Alvin H. Waring
Attorney—Howard P. Terry

[57] ABSTRACT

The condition monitor provides information as to the state of a monitored dual state device having, for example, possible satisfactory and unsatisfactory conditions. Use is made of a passive radio transducer element powered within a moving device by a resonant mechanical system excited primarily by cyclic accelerations. In the unsatisfactory condition of the monitored device, the passive transducer emits a characteristic signal which is detected at a stationary station for the operation of a suitable alarm or remedial control. In the normal or satisfactory condition of the monitored device, the passive transducer is dormant.

19 Claims, 13 Drawing Figures

VEHICLE TIRE CONDITION MONITOR SYSTEM

BACKGROUND OF THE INVENTION

1. Field of the Invention

The invention pertains to condition monitoring means for indicating the state of a dual state device and more particularly for indicating the condition of a monitored device within or upon which a passive transducer is itself mounted, without any requirement of a physical element for directly conducting electrical power to the transducer. An abnormal state of the monitored device is indicated by the radiation of a characteristic signal by the passive transducer.

2. Description of the Prior Art

There has been a general need in the past for means for evaluating conditions of elements of rotating and translating machinery in an inexpensive and efficient manner. Prior art solutions to the problem have generally been complex, since electrical or other power must be supplied from a reliable source to the moving monitoring device by slip rings or by some other such agency. Further, the condition monitor output signal must similarly be coupled from the moving machinery element back to a relatively stationary location for providing an alarm to be acted upon by an operator or for direct operation of an automatic control.

For example, large trucks and other such vehicles having many tires and their cargoes are seriously endangered if one of the vehicle tires becomes underinflated. Such a condition not only leads to rapid tire wear, but rapid heating of the tire body may cause it to ignite, and even that condition may not be noticed immediately by the truck operator. Such fires are notoriously stubborn fires, and may result in the total loss of the vehicle and valuable cargo.

Prior art devices responsive, for example, to tire pressure have included a variety of electrical and mechanical devices for signalling to the truck operator or to other personnel any departure from normal of tire pressure. As suggested above, these devices have required slip ring or equivalent systems to supply power to the pressure monitoring device, and additional such elements to deliver the monitor output signal for use by the truck driver. Such devices wear very rapidly and are highly unreliable under all but most ideally clean and dry roadway conditions. Also unsatisfactory are arrangements responsive to tilting of a wheel or axel of the vehicle due to loss of pressure in a tire. Such devices are undesirably responsive both to the cross section of the roadway and to the load distribution within the vehicle.

It will be appreciated by those skilled in the art of monitoring the operating conditions of kinetic elements of other types of machines that kindred problems arise in many different types of such machines that are not adequately solved by existing condition monitoring equipment. Therefore, there is similarly present a need for providing efficient and effective monitoring apparatus for various types of kinetic elements associated with various kinds of machines for monitoring their various operating characteristics, such as pressure, speed, acceleration, and the like.

SUMMARY OF THE INVENTION

The present invention relates to condition monitoring apparatus for providing information as to the state of a dual state device having, for example, a satisfactory condition and a possible unsatisfactory condition. According to the invention, the condition monitor provides an indication of the condition of the mobile monitored device by employing a passive transducer attached directly to the device to be monitored. The novel transducer does not require the use of certain prior art physical elements, such as for conducting an electrical current for supplying power to the transducer. Where, for example, tire pressure is to be monitored, use is made of a pressure transducer powered by a resonant spring-mass mechanical system mounted within the vehicle wheel and excited primarily by cyclic wheel accelerations. In the unsatisfactory condition of the monitored device, such as in the instance of a low tire pressure condition, the passive transducer emits a characteristic alarm signal which is detected in the interior of the vehicle for the actuation of an alarm or for the operation of a suitable control device.

DESCRIPTION OF THE PREFERRED EMBODIMENTS

Figure 1:
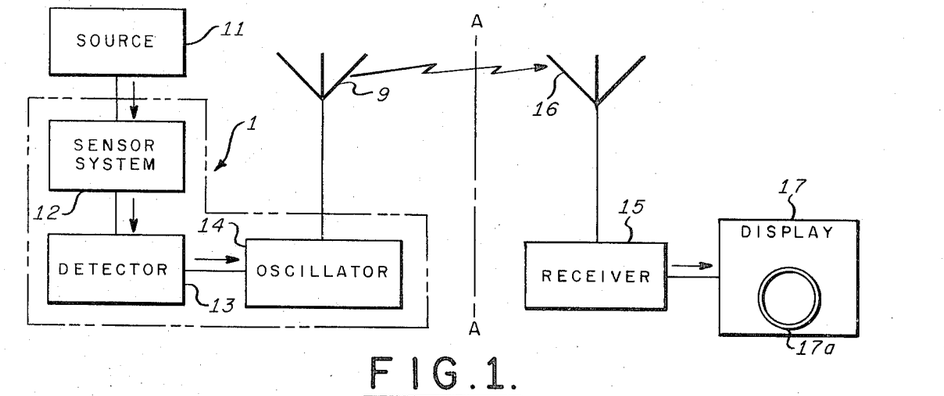
FIG. 1 is a block diagram of a radio transducer and receiver system according to the present invention.
Figure 2:
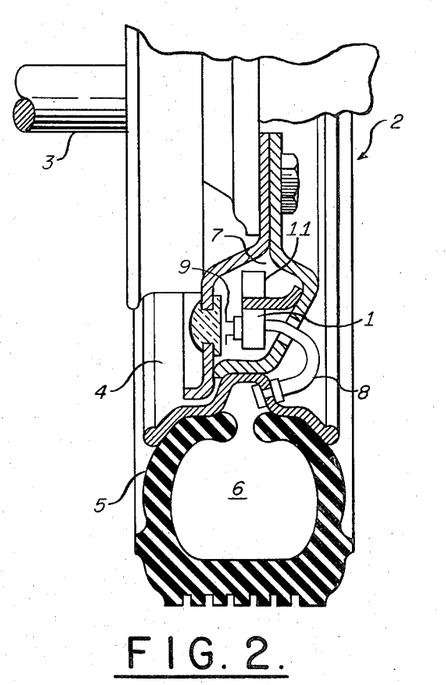
FIG. 2 is an elevation view partly in cross section of apparatus employing the novel monitor.

The novel transducer of the present invention generally represented in FIGS. 1 and 2 includes elements which are mounted upon or within a rotatable element, such as a vehicle wheel, and other elements which are located, for example, in the cab or interior of the vehicle. The elements to the left of the line A—A in FIG. 1 will generally be mounted within the vehicle wheel and comprise a power source 11, a sensor and transmitter or transducer system 1, and an antenna 9. The system 1 may include a pressure or other sensor system 12 and a detector or similar device for converting the output of sensor 12 into a signal capable of operation or of modifying the operation of a relatively high frequency oscillator 14. The output of oscillator 14 is fed to antenna 9 for transmission toward receiver 15.

The cab-mounted receiver 15 is equipped with an antenna 16 for collecting signals broadcast by antenna 9 and has means for converting them for operation of the cab-mounted display 17, which display may include an incandescent or gas discharge lamp 17a as an active display element. The lamp or other display 17a is intended to glow when the gas pressure within a tire 5 as mounted on the protected wheel 4 in FIG. 2 falls below a predetermined minimum value.

In FIG. 2, the novel transducer system 1 of the present invention is employed for monitoring a condition of a rotating machine element in the form of a wheel and tire assembly 2, such as may be employed in a vehicle for hauling freight cargoes. The axle 3, wheel 4, and tire 5 of assembly 2 may be substantially conventional elements. While it will be understood by those skilled in the art that the present invention has many applications, it is illustrated in FIG. 2 in an environment in which it monitors the gas pressure level within the interior 6 of vehicle tire 5. For this purpose, the transducer 1 is conveniently supported in an interior region 7 of the wheel 4. Since it is to monitor the interior gas pressure condition of tire 5, transducer 1 is coupled through a tubular coupling 8 connecting the transducer 1 to the interior 6 of tire 5. If desired, the tubular coupling 8 may be attached to a tee adapter fitted on the conventional tire valve stem of tire 5. Power to operate transducer 1 is supplied by wires (not shown in FIG. 2) connecting power source 11 to device 1.

In FIG. 2, transducer 1 is arranged to transmit a high frequency signal emitted by antenna 9 when the gas pressure within tire 5 reaches an unsatisfactory low condition. Antenna 9 is illustrated, for purposes of convenience in the drawing, as a simple dipole antenna, though it will be understood by those skilled in the art that other kinds of high frequency antennas may be employed for the purpose. When antenna 9 is, for instance, emitting signals that are transmitted outside of wheel 5 through a window 10 sealed adjacent antenna 9 at an appropriate location in wheel 4 as shown in FIG. 2, it is to be assumed that antenna 9 will be in communication with a cooperating antenna 16 located, for example, in a central portion below the vehicle body with respect to its several wheels. In such a configuration, it is anticipated that the cooperating receiver equipment 15, 17 illustrated in FIG. 1 will be located within the vehicle cab.

Figure 3:
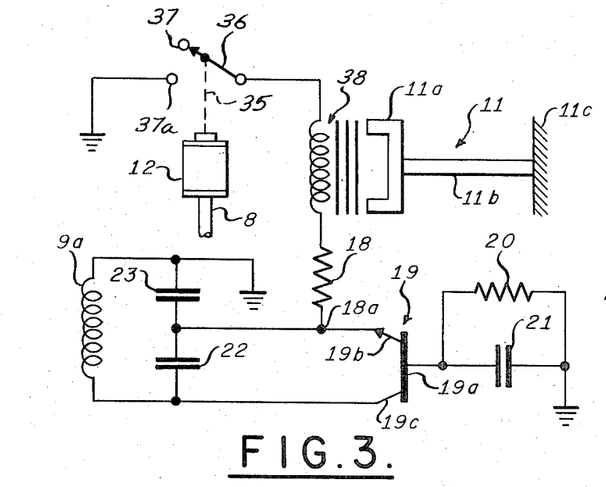
FIG. 3 is a circuit diagram of one form of the transducer employed in the apparatus of FIG. 1.

One form of the transducer 1 of FIGS. 1 and 2 is shown in greater detail in FIG. 3. It is seen that the tubular coupling 8 is connected to supply gas pressure from tire 5 to the interior of a pressure sensing pick off or switch 12 which may be of a conventional type including a deformable diaphragm or other pressure sensing element adapted for moving a mechanical link 13 to move switch blade 14 in turn according to the pressure within the interior of tire 5. For example, if the gas pressure within tire 5 is adequate, switch blade 14 will be in contact with the unused switch contact 15. However, if the pressure within tire 5 and consequently within the tubular coupling 8 falls below a predetermined value, motion of the pressure sensing element within sensor 12 will move switch blade 14 to contact 15a.

The transducer 1 of FIG. 3, when switch blade 14 is touching contact 15a, includes in series circuit with a ground connection the switch blade 14, an inductive pick off coil 17, and a resistor 18. The terminal 18a of resistor 18 is coupled to the emitter electrode 19b of a conventional grounded base transistor oscillator in which the active element is transistor 19 having the usual base 19a, emitter 19b, and collector 19c. Base electrode 19a is connected through the parallel related resistor 20 and capacitor 21 to ground. The emitter electrode 19b is connected through terminal 18a across capacitor 22 and thence back to collector electrode 19c. Capacitor 22 lies in a series resonator circuit including capacitor 23 and an inductance 9a, which latter element may serve the radiating function of antenna 9 of FIG. 1.

The preferred power source 11 is a vibrating element which, as will be explained in greater detail with reference to FIGS. 7 to 9, supplies power in the novel transducer system by utilizing in some manner the energy of natural vibrations or accelerations present when the vehicle wheel is in motion on a roadway. Accordingly, when the vehicle is moving at a speed above a predetermined value, accelerations of the vehicle wheel are sufficient to cause the magnetic polarized armature 11a supported at 11c on the wheel structure by flexible cantilever 11b to induce generally alternating voltages in iron core coil 17 for application as excitation power to transistor 19 of the grounded base oscillator. Consequently, oscillations in the resonant circuit 22, 23, 9a then cause radiation from the coil antenna 9a in a conventional manner.

The vibrating power source 11 may, for example, produce an alternating voltage having a frequency of several cycles per second. Under slow speed conditions, it may result in the provision of a direct current of the order of 1.5 milliamperes at 1.5 volts for operation of a 48 mHz oscillator employing a transistor 19 of the 2N4124 kind, as shown in FIG. 3. Typical of such an example were the following circuit constants:

| | |
|---|---|
| capacitor 21 | 180 picofarads, |
| capacitor 22 | 47 picofarads, |
| capacitor 23 | 7 picofarads, |
| resistor 18 | 470 ohms, |
| resistor 20 | 68,000 ohms, |
| coil antenna 9a | 0.72 microhenries. |

The 48 mc. per second output of coil-antenna 9a is coupled through a space path, as in FIG. 1, to a continuously receptive receiver 15, causing lamp 17a to glow and indicating to the vehicle operator the presence of a tire with dangerously low internal pressure. It is to be understood that the voltage generated by vibratory source 11 is not available to power the transistor oscillator until a decrease of the pressure within tire 5 causes switch 14 to close on contact 15a. When switch 14 does move to contact 15a, indicator lamp 17a is immediately energized.

Figure 4:
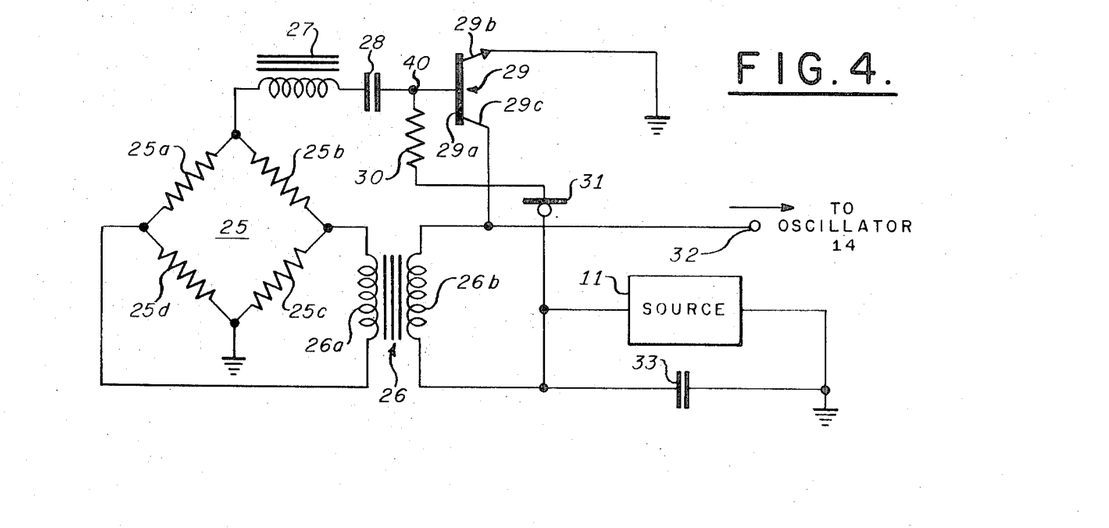
FIG. 4 is an alternative arrangement of part of the circuit of FIG. 1.
Figure 5:
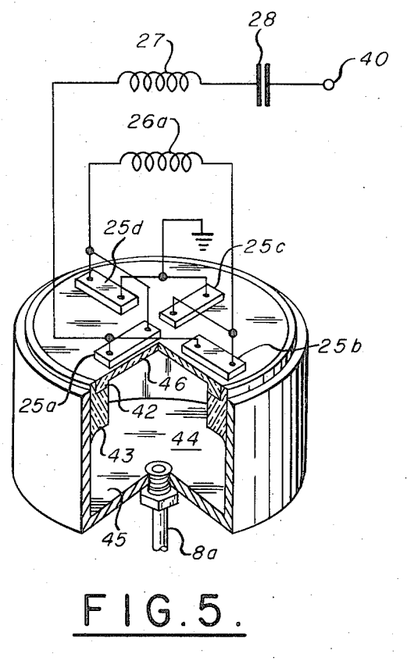
FIG. 5 is a perspective view partly in section of a pressure sensor used with the circuit of FIG. 4.

An alternative transducer system is illustrated in FIGS. 4 and 5, where the switch 14 and pressure pick off 12 are replaced by a conventional piezoresistor bridge circuit 25 made up of series-connected stress sensitive resistors 25a, 25b, 25c, and 25d in the physical configuration shown in FIG. 5. The interior gas pressure of tire 5 is now connected by tube 8a to the interior 44 of a closed cylinder having a rigid end wall 45. The thin pressure sensing diaphragm 46 is rigidly coupled at its periphery to annular flange 43 at location 42 at the top interior of the cylindrical device. With such a conventional configuration, when the gas pressure in tube 8a and interior 44 increases, the central portion of diaphragm 46 bulges outward, while the peripheral parts of the diaphragm move little because of their attachment to flange 43.

Thus, piezoresistors 25a and 25c, for example, change relatively rapidly when the diaphragm 46 is moved being exposed to rapidly changing tension; on the other hand, piezoresistors 25b and 25d, being closer to the periphery of diaphragm 46, change relatively slowly, but in compression. All piezoresistors being intimately mounted on or in diaphragm 46, they are all subjected to substantially the same temperature level so that the bridge is relatively insensitive to ambient temperature variation.

The bridge 25 is coupled into a feed back or transformer coupled transistor oscillator system of generally conventional nature as seen in FIG. 4. The vibratory source 11 is connected through a constant current diode 31 and resistor 30 to terminal 40 and thence to the base 29a of grounded emitter transistor 29. The collector electrode 29c of transistor 29 is coupled to one side of the secondary 26b of transformer 26, whose primary 26a is connected across the output terminals of bridge 25.

A bias voltage and an alternating feed back signal are coupled to terminal 40; the alternating signal is particularly coupled through capacitor 28 and coil 27 to a terminal of bridge 25 opposite its grounded terminal. In a preferred form of the bridge, an initial unbalance is provided so as to increase its sensitivity; the unbalance is slight enough that oscillations do not commence because of circuit losses and the finite gain of the feedback loop. A typical balance off set is of the order of 10 percent, where it is found that a further unbalance of 1 percent induces strong oscillations in the circuit. Such oscillations may be detected as by detector 13 in FIG. 1 to establish a turn-on signal for the 48 mHz output oscillator, or may be applied directly to oscillator 14 to modulate its output for reception by a receiver of the type yet to be discussed relative to FIG. 11. For example, the modulation signal may be capacity coupled to the base of transistor 19 in FIG. 3.

In operation, only when the vibratory source 11 of FIG. 4 is supplying power to transistor 29 through diode 31, bridge 25 and the feed back circuit associated with it will break into oscillation when the pressure against diaphragm 46 falls sufficiently, the series resonant circuit 27, 28 determining the frequency of those oscillations. A modulation is therefore supplied to the carrier oscillator 14 and the modulated carrier is broadcast by antenna 9 to antenna 16 and receiver 15. If receiver 15 is equipped with a conventional modulation detector, the modulation frequency may be passed by a filter for amplification and application to indicator 17a. In the transducer circuit of FIG. 4, transistor 29 may be a 2N5089 transistor, while diode 31 may be a constant current field effect diode of the 1N5283 kind. Representative circuit constants are as follows:

| | |
|---|---|
| capacitor 28 | 0.005 microfarads, |
| capacitor 33 | 2.0 microfarads, |
| resistor 30 | .68 K ohms, |
| coil 27 | 0.5 henries. |

The modulation oscillator may operate between 5 and 10 KHz and the carrier may be of the order of 48 to 50 MHz.

Figure 4A:
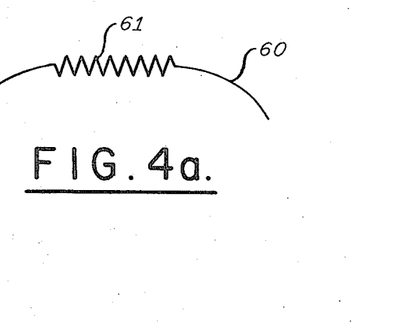
FIG. 4a is a graph of a wave form useful in explaining a mode of operation of the circuit of FIG. 4.
Figure 6:
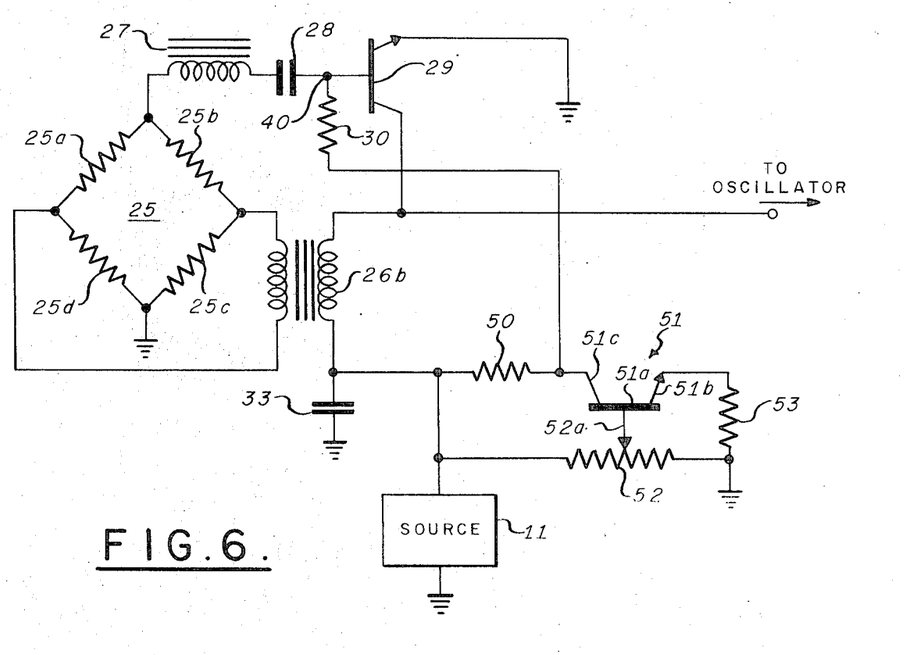
FIG. 6 is an alternative form of the circuit of FIG. 4.

Alternatively, the regulated power supply arrangement of FIG. 6 may be used; in FIG. 6, elements corresponding to those found in FIG. 4 bear the same reference numerals in this arrangement, structure and operation are generally similar to those of the arrangement of FIG. 4. However, vibratory source 11 is now connected to one end of secondary 26b and through resistors 50 and 30 to terminal 40. Resistor 50 is also coupled to the collector 51c of regulator transistor 51, whose emitter 51b is coupled through resistor 53 to ground and whose base 51a is connected by tap 52a to potentiometer 52. Potentiometer 52 is connected between source 11 and ground. In this circuit, the collector-to-ground impedance of the control or regulator transistor 51 is varied by the voltage on tap 52a in such a way that the bias on base 29a of oscillator transistor 29 swings through a class A oscillator region on a portion of each positive cycle so that the bridge circuit bursts into oscillation if the bridge (25) unbalance is appropriate. It will generally be understood, with regard to the arrangements of FIGS. 4 and 6, that the modulation signal representing dangerously low tire pressure will as in FIG. 4a, appear in bursts as at 61 at a maximum positive value of the signal 60 generated by vibratory source 11. Representative circuit constants for the FIG. 6 circuit are as follows:

| | |
|---|---|
| capacitor 28 | 0.005 picofarads, |
| resistor 30 | 68,000 ohms, |
| resistor 50 | 10,000 ohms, |
| resistor 52 | 100,000 ohms, |
| resistor 53 | 750 ohms, |
| coil 27 | 0.5 microhenries. |

Transistor 29 may be a 2N5089 transistor, while transistor 51 is of the 2N2219A kind. Piezoresistors 25a and 25d may both be about 990 ohms, piezoresistor 25b 1,130 ohms, and piezoresistor 25c 981 ohms. As will be apparent to those skilled in the art, the representative values indicated in the foregoing are purely representative values, and a wide variety of choices of circuit parameters may successfully be used depending upon the selected transistors and diodes, the carrier and modulation frequencies desired, and the like.

The vibration power source 11 of FIGS. 1 and 3 will now be discussed in greater detail in connection with FIGS. 7, 8, and 9; as previously noted, source 11 may make use of energy found in the natural vibrations and accelerations generally present when a vehicle wheel is in motion due to road shock, tire unbalance, and the like. In FIG. 7, it is seen that source 11 includes a flexible cantilever 11b clamped at one end at 11c by a clamp 65 fastened to one end of base plate 68. Cantilever 11b supports an armature 11a which in the example given has a generally U-shaped contour facing multi-turn coil 17. Coil 17 has a core 66 curved at extension 77 to join a second end of base plate 68. Core 66 and armature 11a form a short magnetic gap varied when armature 11a swings on cantilever 11b at the natural period of the system. Base 68, clamp 65, cantilever 11b, and core 66 and its extension 67 may be formed of a soft magnetic material such as iron or the like, though cantilever 11b should have spring-steel characteristics. Armature 11a is a small horseshoe type of permanent magnet fixed at the free end of cantilever 11b. Stops 69, 69a serve to limit the extent of travel of armature 11a. The spring-mass system formed of elements 11a, 11b provides a resonant system.

Vibrations of a random nature along two of the axes of the wheel are not masked by centrifugal forces; i.e., along the main axis of the wheel 5 and tangential to the wheel, even at speeds as low as a very few miles per hour along rough roads. More important, a reliable cyclic rather than random acceleration is available due to the combined effect of the rotation of the wheel and the forward motion of the vehicle. This energy source can be explained by the observation that, when a portion of the outer surface of a tire is in contact with the road at the lowest point of tire rotation, its lineal velocity relative to the road is zero. On the other hand, when the tire has rotated 180 angular degrees to its topmost position, its lineal velocity relative to the road is twice that of the vehicle. The corresponding cyclic acceleration has a frequency N, where N is also the angular velocity of the wheel in revolutions per second. The peak amplitude of the acceleration is:

$$A_{max} = K\omega^2 R$$

where:
$\omega$ = angular velocity of the wheel,
$R$ = the radius of the point at which the measurement is made along any radius of the wheel, and
$K$ is a constant of proportionality.

The instantaneous value of this acceleration of the wheel at any angle $\alpha$ measured from the vertical is:

$$A_t = K\omega^2 R \sin\alpha.$$

The peak value of this acceleration is approximately equal to two-thirds that of the centrifugal acceleration, where both are measured at the same point R along the wheel radial, giving acceptably high electrical power output for speeds as low as 10 miles per hour even on smooth roads.

Figure 7:
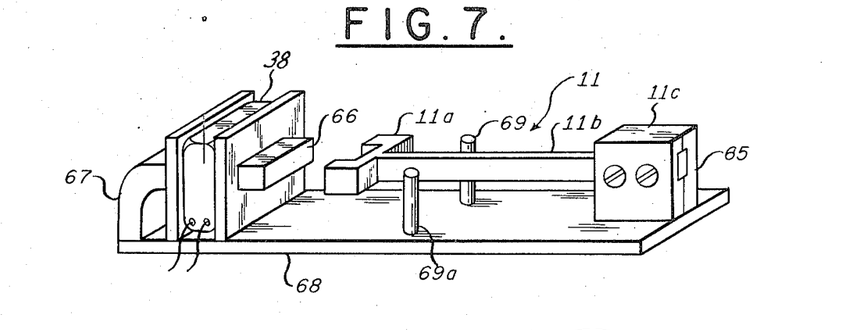
FIG. 7 is a perspective view of the power source of FIGS. 1, 4, and 6.
Figure 8:
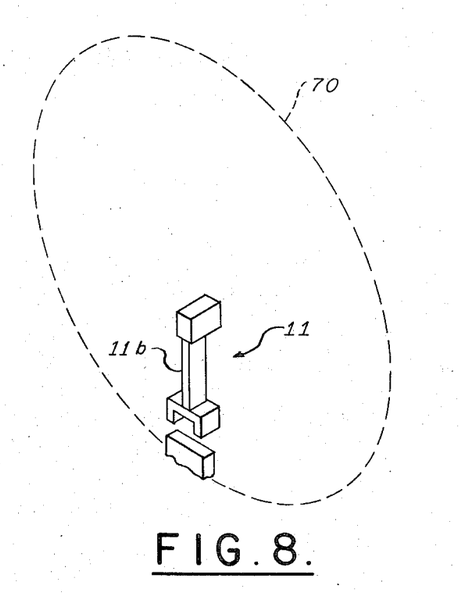
FIGS. 8 and 9 schematically illustrate how the power source of FIG. 7 is attached to a vehicle wheel.

The configuration in FIG. 7 is such that at some portion of the vibration period, a substantial portion of the flux lines issuing from the magnetic poles of armature 11a enters the iron core 66 and threads the turns of of coil 17. The changing gap length and the changing position of the magnetic poles of armature 11a relative to core 66 cause changes in the flux density threading coil 17, thus inducing a substantially sinusoidal voltage across the coil. In order best to utilize the available energy, the source 11 is mounted so that the axis spring 11b lies along the wheel radius with its clamped end 11c directed toward the center of the wheel and the magnet armature mass pointing toward the periphery of the wheel. Spring 11b is oriented as in FIG. 8 so that its major cross-section dimension is perpendicular to the plane 70 of the wheel, thus assuring that that spring 11b bends only in the plane 70 of the wheel and not perpendicular to it.

Figure 9:
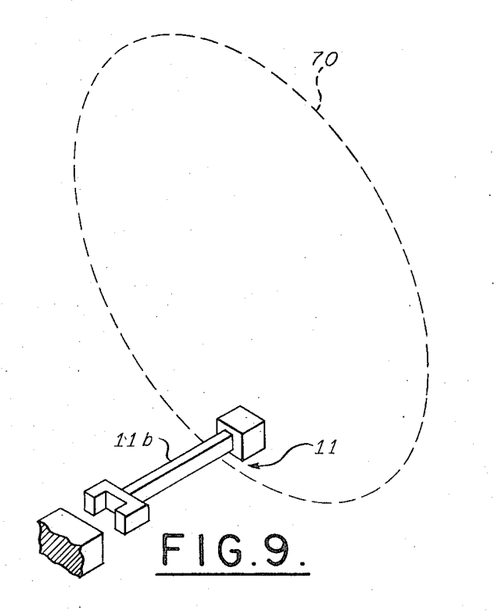

An alternative mounting for source 11 is shown in FIG. 9; in this arrangement, the major dimension of spring 11b is perpendicular to plane 70 and the major cross-sectional dimension of spring 11b lies in the direction of a wheel radius. Accordingly, the major cross-sectional dimension of spring 11b resists bending due to wheel-generated centrifugal force, and yet the mass-spring system 11a–11b is impulsed by the same wheel accelerations as in the case of FIG. 8. It will be understood that the natural frequency of the mass-spring system 11a–11b selected to be less than 2N, where N is the highest expected angular velocity of wheel 5 in revolutions per second, since the impulsing frequency must be equal to or preferably less than the natural frequency.

Figure 10:
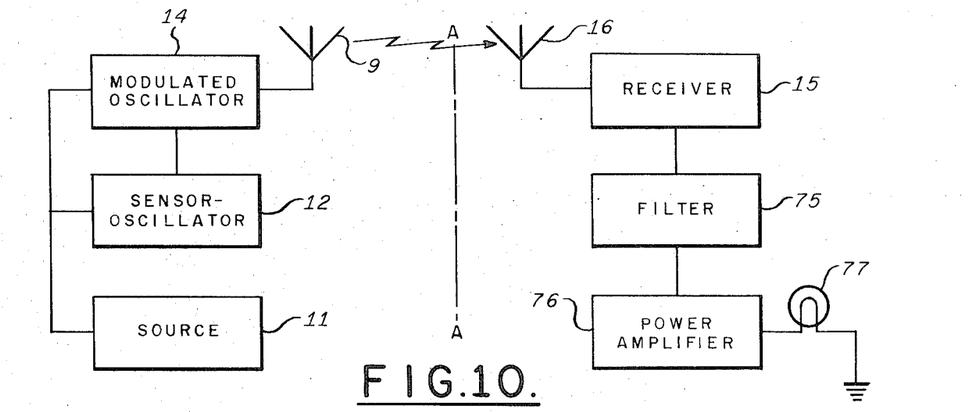
FIG. 10 is a block diagram of one form of the system of FIG. 1.

In FIG. 10, it is seen that a typical system according to the invention will utilize a vibratory source to power a sensor-oscillator device 12 as described in the foregoing, supplying modulation signals for modulating the carrier broadcast from modulated oscillator 14 by antenna 9 when the tire pressure has fallen dangerously low. The alarm transmissions will be received by antenna 16 and coupled to receiver 15, where the modulation signal is detected. A modulation signal passing through filter 75 is amplified, if necessary, and is applied to excite lamp 77. The receiver system is continuously energized when the vehicle is in operation. The voltage developed in the transmitter system by source 11 is available only when the vehicle is in motion. If tire pressure falls, the conventional tone burst oscillator of sensor-oscillator 12 operates, modulating the transmissions of broadcast oscillator 14. The signal applied to receiver 15 is detected and if passed by filter 75 is used to operate light 77.

Figure 11:
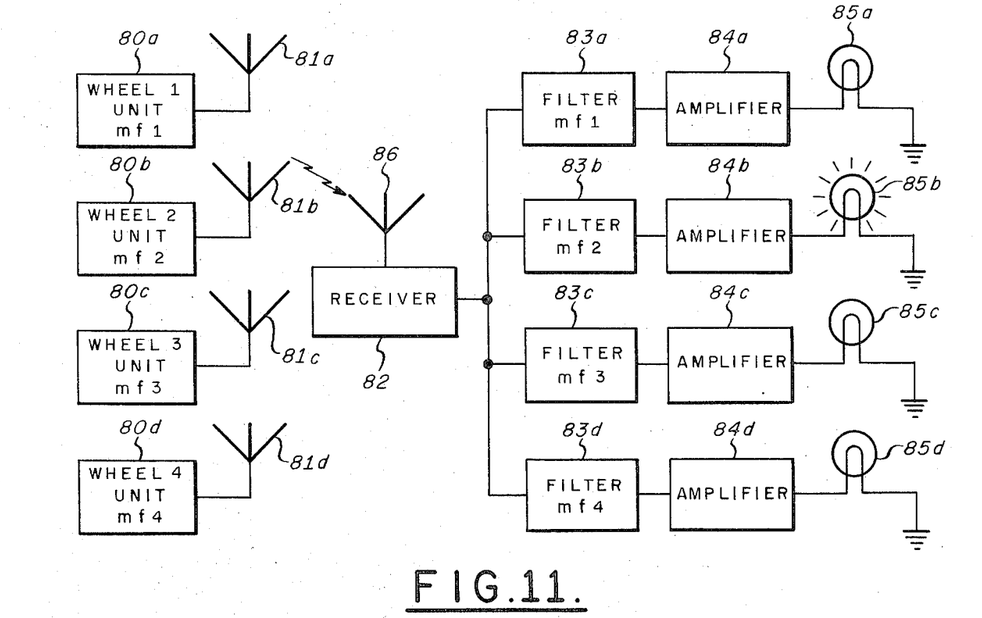
FIGS. 11 and 12 are block diagrams of forms of the invention of FIG. 1 useful with multiple-wheel vehicles.

Various means may be used for coding the alarm signals so that the vehicle operator is made instantly aware of what tire or tires has become a problem. For example, FIG. 11 illustrates the use, in a vehicle having four wheels, of wheel mounted units 80a, 80b, 80c, 80d respectively associated with first, second, third, and fourth wheels of the vehicle, and each having its discrete antenna 81a, 81b, 81c, 81d. Each wheel unit has a transducer system as previously described having a distinguishing modulation frequency as designated in the drawing by the distinctive modulation frequencies $mf_1$, $mf_2$, $mf_3$, $mf_4$. The cab-mounted receiver 82 is designed to receive modulated carrier signals from any of the several transducer antennas 81a, 81b, 81c, 81d via receiver antenna 86. Receiver 82 demodulates the received signals and passes the detected modulation signals to filters 83a, 83b, 83c, 83d, each having a relatively narrow pass band associated with one of the modulation frequencies $mf_1$, $mf_2$, $mf_3$, $mf_4$. Each filter is connected to its own power amplifier 84a, 84b, 84c, 84d and thence to its corresponding display lamp 85a, 85b, 85c, 85d. In the representation of FIG. 11, wheel unit 80b, having a modulation frequency $mf_2$ is, because of low pressure in the tire on wheel 2, shown transmitting a modulated carrier signal from antenna 81b to receiver antenna 86; thus, receiver 82 demodulates the received signal, and the modulation signal passes only through filter 83b and thence through amplifier 84b to lamp 85b. Other wheel transponder units having their own distinct modulation frequencies, excite one of the other lamps 85a, 85c, 85d according to the respective modulation frequency $mf_1$, $mf_3$, or $mf_4$. The carrier frequency of all of the wheel units may, for example, be 48 mHz, while the values of the respective modulation of frequencies $mf$ may be 3, 5, 7, and 9 kHz.

Figure 12:
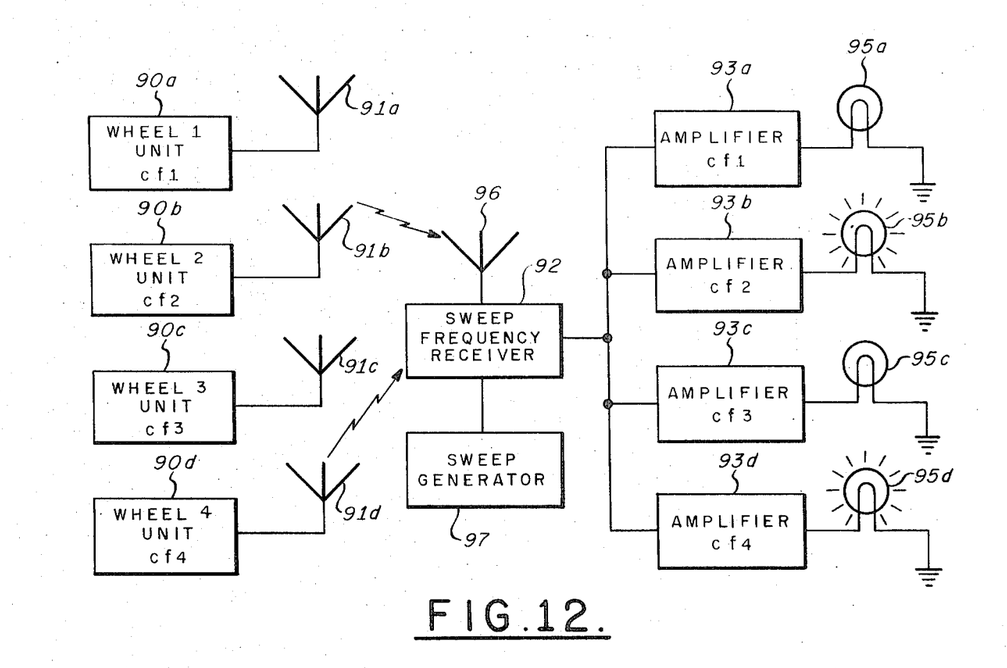

For a system in which the wheel mounted units generate simply a carrier signal when tire pressure in one wheel is low, the arrangement of FIG. 12 may be employed, this arrangement being preferred if there is a possibility that two or more tires may simultaneously go soft. Each wheel unit may be, for example, similar to the transducer of FIG. 3, wheel units 90a, 90b, 90c, 90d operating at respective unmodulated carrier frequencies $cf_1$, $cf_2$, $cf_3$, $cf_4$ radiated by the respective antennas 91a, 91b, 91c, 91d toward receiver antenna 96. The receiver system attached to antenna 96 employs a conventional swept frequency receiver 92 controlled by a sweep wave generator 97. The output of receiver 92 is coupled to each of a series of tuned amplifiers 93a, 93b, 93c, 93d, each having a band pass centered at a respective carrier frequency $cf_1$, $cf_2$, $cf_3$, $cf_4$, and each supplying a respective indicator lamp 95a, 95b, 95c, 95d. By way of example, FIG. 12 shows that, with the pressure in tires of wheels 2 and 4 low, wheel units 90b and 90d broadcast signals toward receiver antenna 96. As the pass band of receiver 92 is swept, impulses are supplied through the respective tuned amplifiers 93b and 93d, illuminating lamps 95b and 95d.

It is to be understood that amplifiers 84a, 84b, 84c, 84d of FIG. 11, or amplifiers 93a, 93b, 93c, 93d of FIG. 12 may contain latching relays so that corresponding low tire pressure lamps may be held in the on state once an alarm signal is detected, to be reset by the operator in the conventional manner. Furthermore, false alarm discrimination against alarm signals generated in similarly equipped passing vehicles may be had by use of suitable delay or counter networks requiring that the signal applied to the receiver be present for a brief period, such as five seconds, before the warning light in the cab is activated.

It is further within the scope of the invention that such a monitoring signal may also be supplied to an appropriate actuator to exercise remedial control over the adverse situation. For example, in the instance of a pneumatically tired vehicle, such an actuator may cause operation of a control device such as a conventional hydraulic braking system or other controlled device. If desired, a suitable time delay may be injected in the circuit before the actuator, giving the operator time to take corrective measures, if he is able to do so, before automatic control is exercised.

It is seen that the novel condition monitor may be used in a wide variety of situations to provide information as to the satisfactory or unsatisfactory state of a monitored device. The versatility of the concept is illustrated by the fact that it may be used continuously or intermittently to monitor the condition of stationary or of moving elements of apparatus. It may be incorporated in total as a permanent part of such equipment, or may be used with portable test facilities or with facilities such as may be located along a route of a vehicle, for example. In particular, it provides means for evaluation of the condition or conditions of elements of rotating or translating machinery in an inexpensive and efficient manner.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. Apparatus for monitoring the condition of a vehicle wheel-mounted device having first and second possible conditions comprising:
   motion responsive means affixed to said wheel for generating an oscillating voltage in response to movement of said vehicle above a predetermined speed,
   wheel-mounted sensor means for sensing said conditions of said device, and
   wheel-mounted radio transmitter means actuated by said oscillating voltage and responsive to said sensor means for transmitting radio signal representative of said first condition.

2. Apparatus as described in claim 1 wherein said motion responsive means comprises:
   resilient means having first and second ends, said first end being affixed to said wheel, said second end supporting magnetically polarized armature means, and
   magnetic field responsive means affixed to said wheel for generating said oscillating voltage when said armature means repeatedly swings past said magnetic field responsive means in response to movement of said vehicle above said predetermined speed.

3. Apparatus as described in claim 2 wherein said resilient means comprises resilient cantilever means having a major dimension lying substantially parallel to a radius of said wheel and adapted for flexing in a plane substantially parallel to the plane of the radii of said wheel.

4. Apparatus as described in claim 3 wherein said resilient cantilever means has an end affixed to said wheel proximate the center of said wheel, said cantilever major dimension being directed substantially parallel to the plane of said radii of said wheel toward the periphery thereof.

5. Apparatus as described in claim 2 wherein said resilient means comprises resilient cantilever means having a major dimension substantially perpendicular to the plane of the radii of said wheel and adapted for flexing in a plane substantially at right angles to the plane of the radii of said wheel.

6. Apparatus as described in claim 5 wherein said resilient cantilever means has an end affixed to said wheel at a radius of said wheel and spaced between the center and the periphery of said wheel.

7. Apparatus as described in claim 2 comprising magnetic circuit means including:
   said magnetic armature means,
   said resilient means,
   core means magnetically coupled to said magnetic field responsive means, and
   magnetic means for defining a magnetic flux path from said resilient means to said core means,
   said armature means and said core means being spaced apart for defining variable air gap means.

8. Apparatus as described in claim 2 wherein said resilient means and said armature means may be represented by an equivalent mass-spring system having a natural frequency less than 2N, where N is the highest expected natural frequency of rotation of said wheel.

9. Apparatus as described in claim 2 wherein said wheel-mounted sensor means comprises:
   variable impedance means having first and second states, and
   condition sensing means responsive to said first and second conditions of said wheel-mounted device for placing said variable impedance means in said respective first or second states.

10. Apparatus as described in claim 9 wherein:
    said wheel-mounted radio transmitter means comprises oscillator circuit means having resonant circuit means including capacitive and inductive means,
    said variable impedance means and said magnetic field responsive means are connected to supply said oscillating voltage to said oscillator circuit means, and
    said inductive means is adapted to radiate said radio signal only when said variable impedance means is in its first state.

11. Apparatus as described in claim 9 wherein:
    said variable impedance means comprises switch means, and
    said condition sensing means comprises pressure sensing means.

12. Apparatus as described in claim 9 wherein:
said variable impedance means comprises piezoresistor means responsive to said condition of said device.

13. Apparatus as described in claim 12 further including:
transistor oscillator means adapted to cause radiation of said radio signal when said wheel-mounted device is in its said first condition,
said piezoresistor means being connected in feed back path of said transistor oscillator means.

14. Apparatus as described in claim 13 wherein:
said condition sensing means comprises pressure sensing means having flexible diaphragm means, and
said piezoresistor means being responsive to pressure induced flexing of said diaphragm means.

15. Apparatus as described in claim 14 wherein:
said piezoresistor means comprises bridge circuit means having at least one strain sensing resistor means and having first and second pairs of opposed port means,
said transistor oscillator means having input means coupled across said first pair of opposed port means, and
said transistor oscillator means having output means coupled across said second pair of opposed port means.

16. Apparatus as described in claim 2 wherein said wheel-mounted transmitter means comprises:
first oscillator means for generating a modulation signal,
second oscillator means adapted for modulation by said modulation signal,
antenna means for radiating the output of said modulated second oscillator means,
said first and second oscillator means being responsive to said sensor means only when said magnetic field responsive means supplies said oscillating voltage to said first and second oscillator means.

17. Apparatus as described in claim 16 comprising:
receiver means for detecting the modulation envelope of said radiated output of said second oscillator means,
filter means having a pass band centered at the frequency of said modulation, and
indicator means responsive to the presence of said modulation frequency for indicating an unsatisfactory condition of said device.

18. Apparatus as described in claim 2 additionally comprising:
receiver means for receiving said transmitter radio signal, and
indicator means responsive to said receiver means for indicating only the first condition of said wheel-mounted device.

19. Apparatus as described in claim 2 additionally comprising:
means responsive to said sensor means for modulating the output of said radio transmitter means only in the first condition of said wheel-mounted device,
receiver means for receiving and demodulating said modulated output,
filter means adapted to pass said modulation frequency, and
indicator means responsive to the presence of said modulation frequency.

* * * * *